US005923300A

United States Patent [19]

Mejia

[11] Patent Number: 5,923,300

[45] Date of Patent: Jul. 13, 1999

[54] MULTI-PHASE TRANSMITTER WITH SINGLE RECEIVE ANTENNA FOR TRANSPONDER INTERROGATOR

[75] Inventor: E. Zeke Mejia, Longueuil, Canada

[73] Assignee: Destron-Fearing Corporation, South St. Paul, Minn.

[21] Appl. No.: 08/832,213

[22] Filed: Apr. 3, 1997

[51] Int. Cl.[6] ................................ H01Q 1/36; G01V 3/30

[52] U.S. Cl. .......................... 343/788; 343/866; 343/867; 343/742; 343/720; 340/870.01; 340/825.54; 324/338; 250/33

[58] Field of Search ....................... 340/825.54; 343/742, 343/867, 895, 720, 866; 324/338, 332–337; H01Q 1/36; G01V 3/30

[56] References Cited

U.S. PATENT DOCUMENTS

| | | | |
|---|---|---|---|
| 2,339,234 | 1/1944 | Polydoroff | 250/33 |
| 2,354,332 | 7/1944 | Polydoroff | 250/33 |
| 2,399,382 | 4/1946 | Polydoroff | 250/33 |
| 5,012,236 | 4/1991 | Troyk | 340/825.54 |

*Primary Examiner*—Robert Kim
*Assistant Examiner*—Layla G. Lauchman
*Attorney, Agent, or Firm*—Stroock & Stroock & Lavan LLP

[57] ABSTRACT

An antenna includes a transmitter including a first transmit coil wound in a first direction. A second transmit coil is electrically coupled to the first transmitter and wound in a second direction opposite to the first direction.

10 Claims, 1 Drawing Sheet

MULTI-PHASE TRANSMITTER WITH SINGLE RECEIVE ANTENNA FOR TRANSPONDER INTERROGATOR

BACKGROUND OF THE INVENTION

This application is directed to an antenna for use in radio frequency identification device (RFID) antennas, and in particular, multi-coil RFID interrogator antennas.

It is known in the art from U.S. Pat. No. 5,012,236 to provide a multi-coil RF antenna for an RFID interrogator. As shown in FIG. 1, the prior art antenna generally indicated as 10 includes a polygonal core 12 formed of iron or plastic. A single transmit antenna 18 is wound about core 12. A receive antenna structure 15 formed of a single wire includes a first receive coil 14 wound about core 12 at a first end of core 12 in a first direction and a second receive coil 16 wound about core 12 at an opposite end thereof wound in a second direction. As a result coil 16 and coil 14 are configured in a differential relationship. In such a relationship a signal received equally at each coil 14, 16 will cancel itself out. A signal which is received with more power at one coil than the other will produce an internal signal to the interrogator which is stronger from one receive coil than the signal produced at the other receive coil, so that after the differential operation, the stronger signal is not entirely cancelled and a signal remains to be processed by the interrogator.

The prior art antenna suffers from several disadvantages. First, the transponder to be monitored is passive and is implanted within an animal. The final position of the implanted transponder cannot be controlled. However, to best be activated, the transponders need a magnetic field to be emitted along the length of the transponder antenna's axis. The magnetic field generated by transmit coil 18 of antenna 10 is aligned almost entirely along the axis of core 12. Therefore, to optimize reading of a transponder, the axis of the transponder must be aligned with the axis of the RFID interrogator antenna. This is not always possible when dealing with implanted live animals which are moving and which conceal (under the skin) the orientation of the transponder.

Another shortcoming of the prior art antenna is that because it is a differential antenna, the receive coils are very sensitive to differential imbalance interference. Furthermore, a differential coil through its action of cancelling out the transmit signal, inherently weakens the signal received by the antenna prior to operation upon the signal by the interrogator. Accordingly, it is desirable to provide an antenna for an interrogator which overcomes the shortcomings of the prior art.

SUMMARY OF THE INVENTION

An antenna includes a coil. A receive coil for receiving RF signals is wound about the core and operatively coupled to the interrogator. A first transmit coil is wound in a first direction about the core at one end of the core. A second coil coupled to the first coil is wound about the core in a second direction opposite to the first direction and is disposed at an opposed end of the core.

Accordingly, it is an object of the invention to provide an improved RFID interrogator antenna.

It is a further object of the invention to provide a multi-directional antenna for activating a passive transponder.

Still another object of the invention is to provide an antenna which is less sensitive to the orientation of the transponder.

Still another object of the invention is to provide an antenna which is less sensitive to differential unbalance interference and which provides a stronger output signal to the interrogator circuitry.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
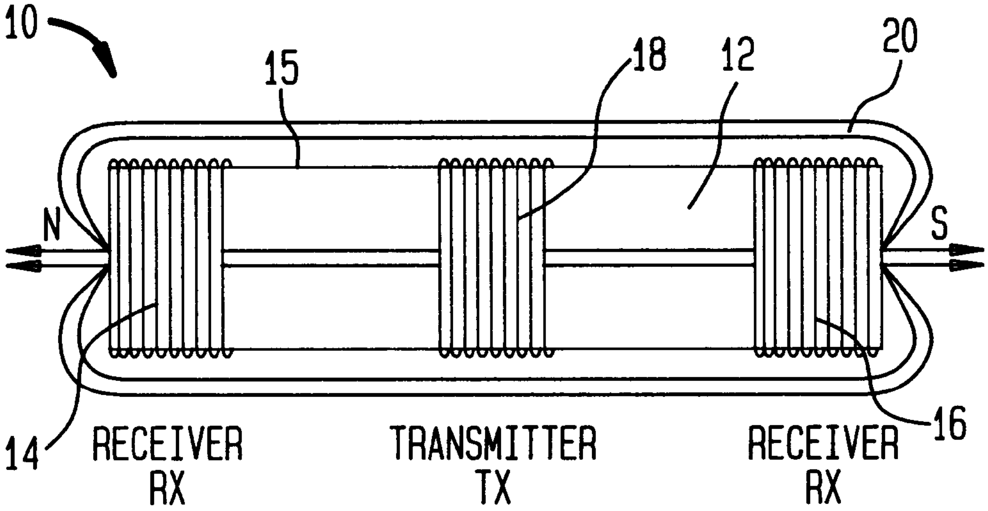
FIG. 1 (PRIOR ART)
FIG. 1 is a schematic diagram of an interrogator antenna constructed in accordance with the prior art showing the magnetic field flux lines.
Figure 2:
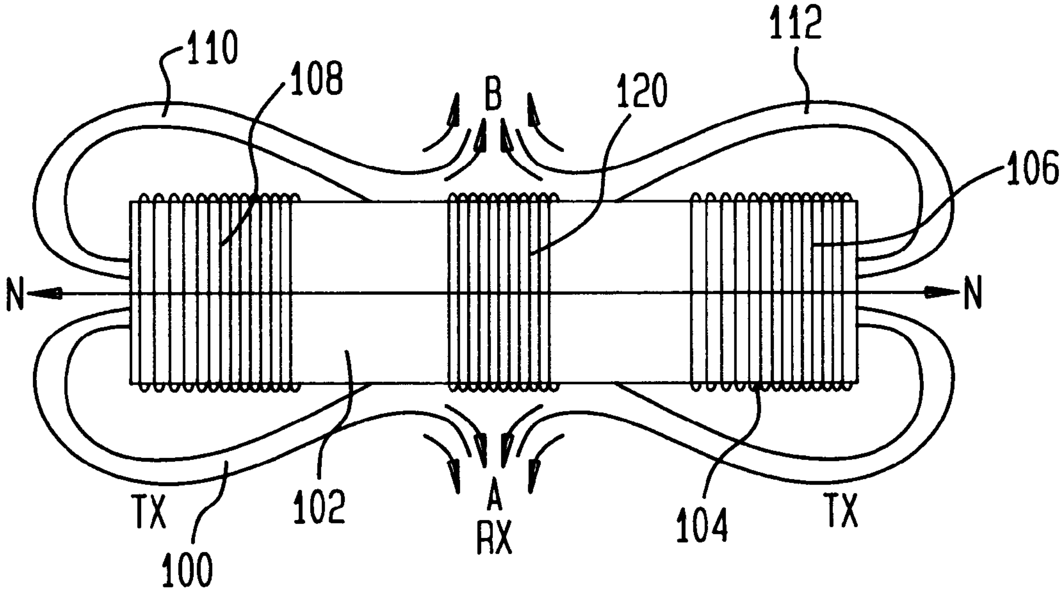
FIG. 2 is a schematic diagram of an interrogator antenna constructed in accordance with the present invention showing the magnetic field flux lines.

Reference is made to FIG. 2 in which a multi-phase transmitter with single receive antenna coil, generally indicated at 100 constructed in accordance with the invention is provided. Antenna 100 includes a core 102. A transmitter, generally indicated as 104 includes a first transmit coil 106 wound about core 102 at a first end of core 102. Transmitter 104 includes a second coil 108 electrically coupled to coil 106 and wound about core 102 in a direction opposite to the first direction. A driving signal from an interrogator circuit is input thereto as known in the art, driving signal is transmitted by driving transmitter 104 to operate a transponder. In a preferred embodiment coils 106, 108 are formed from a single wire. In a preferred embodiment, the coils are in series and driven by the same drive signal, i.e. same drive current; however the coils can also be arranged in parallel and driven by the same signal to produce the desired magnetic fields.

Polarity is a function of the current flow. Because coils, 106, 108 are at opposed ends of core 102 and wound in opposite directions they generate fields of opposite polarity so that the magnetic fields at the ends of core 102 are of the same polarity. For example, in the embodiment of FIG. 2, a North magnetic pole is formed at each end of core 102.

As a result coils 106, 108 produce opposing magnetic fields 110, 112 relative to each other. As seen in FIG. 2, the magnetic fields flow in directions indicated by arrows A and B. Generally, the lower field (adjacent the respective ends of core 102) extend along the axis of antenna 100. However, farther along the magnetic flux field the anti-phase fields 110, 112 interfere with each other, bending the fields in directions indicated by arrows A, B to also extend substantially orthogonally from core 102. Accordingly, the magnetic flux flows in substantially two directions, a first direction substantially along the axis of antenna 100 and a second direction substantially orthogonal to antenna 100. As a result, antenna 100 is a multi-directional antenna. Fields 110, 112 are bent as a result of the interrelationship of the two out of phase fields. The region where the fields bend can be controlled by varying the strength of the field produced at either one of coils 106, 108 or controlling the timing of the driving signal. By making one field stronger than the other, the amount of bend and the position at which the bend occurs will be moved along core 102. Furthermore, by controlling the timing of the drive signal to each individual coil, the phase differential can be shifted affecting the interplay between the two fields 110, 112 and thereby affecting the overall shape of the resultant magnetic field.

A receive antenna 120 is formed of a coil wound about core 102 and disposed between coils 106, 108. Receive antenna 120 receives the response signal from a transponder and inputs the receive signal to the circuitry of the interrogator for processing as is known in the art.

Because receive antenna 120 is mounted in such close proximity to transmit coils 106, 108, receive coil 120 can be overpowered by transmit antenna 104. Accordingly, the receive coil 120 is balanced relative to the transmit coils 106, 108. In one exemplary embodiment, the receive antenna is placed at a null point of the magnetic fields, i.e. where the two opposing magnetic fields 110, 112 bend each other out at the core 102. By way of example, if coils 106, 108 are driven with the same signal and produce anti-phase fields, the null point would be the midpoint between the two coils. A second way to neutralize the effect of the transmit signal at the receive coil is by utilizing a ferro-magnetic material moving along the axis of the receive antenna.

By providing an RFID interrogator antenna utilizing two transmit coils driven to produce fields anti-phase to bend the magnetic fields between the two coils and generate additional field vectors in other directions, a multi-directional or omni-directional antenna is provided reducing the necessity to orient the antenna relative to a transponder to be interrogated. The additional fields which are perpendicular to the axis of the antenna enable easy activation of the transponders that are not aligned with the central axis of interrogator antenna. Additionally, by utilizing a single receive coil, balancing the receive antenna is simpler than balancing multiple differential receive antennas. Furthermore, by utilizing a single receive antenna, a stronger signal is available to be operated upon because no differential process is performed on the signal.

By driving magnetic fields 110, 112 to produce anti-phase fields, the fields react with each other to bend the fields between the two transmitters to generate additional field vectors in various directions along the face of the core. As a result, additional fields perpendicular to the axis of antenna as shown by arrows A, B are produced.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An antenna, comprising:

a transmitter, said transmitter including a first transmit coil wound in a first direction, a second transmit coil, electrically coupled to said first coil, and wound in a second direction opposite to the first direction, and a receive coil disposed between said first transmit coil and said second transmit coil.

2. An antenna, comprising:

a core, said core having a first end and second end;

a transmitter, said transmitter including a first transmit coil disposed at said first end of said core and wound in a first direction, a second transmit coil, disposed at said opposite end of said core, electrically coupled to said first coil, and wound in a second direction opposite to the first direction, and a receive coil disposed about said core between said first coil and second coil.

3. The antenna of claim 1, wherein said receive coil is disposed at a null point between said first transmit coil and said second transmit coil.

4. The antenna of claim 1, wherein said first coil and said second coil are coupled in series.

5. The antenna of claim 1, wherein said first coil and said second coil are coupled in parallel.

6. The antenna of claim 2, wherein said receive coil is disposed at a null point between said first transmit coil and said second transmit coil.

7. The antenna of claim 2, wherein said first coil and said second coil are coupled in series.

8. The antenna of claim 2, wherein said first coil and said second coil are coupled in parallel.

9. The antenna of claim 1, wherein said transmitter is sized and arranged to be disposed within a transponder interrogator.

10. The antenna of claim 2, wherein said transmitter is sized and arranged to be disposed within a transponder interrogator.

* * * * *